(12) United States Patent
Yang et al.

(10) Patent No.: US 8,478,821 B2
(45) Date of Patent: Jul. 2, 2013

(54) NETWORK MEMBERSHIP MANAGEMENT FOR PEER-TO-PEER NETWORKING

(75) Inventors: Bo Yang, Palo Alto, CA (US); Evan Pedro Greenberg, Palo Alto, CA (US)

(73) Assignee: Veetle, Inc., Palo Alto, CA (US)

( * ) Notice: Subject to any disclaimer, the term of this patent is extended or adjusted under 35 U.S.C. 154(b) by 188 days.

(21) Appl. No.: 13/040,344

(22) Filed: Mar. 4, 2011

(65) Prior Publication Data

US 2011/0219072 A1 Sep. 8, 2011

Related U.S. Application Data

(60) Provisional application No. 61/311,141, filed on Mar. 5, 2010.

(51) Int. Cl.
*G06F 15/16* (2006.01)
(52) U.S. Cl.
USPC ............ 709/204; 709/205; 709/206; 709/227
(58) Field of Classification Search
USPC ........................................................ 709/204
See application file for complete search history.

(56) References Cited

U.S. PATENT DOCUMENTS

| | | | | |
|---|---|---|---|---|
| 7,319,888 | B2* | 1/2008 | Li et al. ...................... | 455/562.1 |
| 7,899,451 | B2* | 3/2011 | Hu et al. ..................... | 455/422.1 |
| 2003/0115251 | A1* | 6/2003 | Fredrickson et al. ......... | 709/201 |
| 2004/0162871 | A1* | 8/2004 | Pabla et al. .................. | 709/201 |
| 2005/0157678 | A1* | 7/2005 | Mantha et al. ............... | 370/329 |
| 2006/0123125 | A1* | 6/2006 | Weisman et al. ............. | 709/227 |
| 2006/0252439 | A1* | 11/2006 | Cai ............................. | 455/515 |
| 2008/0281935 | A1* | 11/2008 | Cragun ....................... | 709/206 |
| 2009/0055471 | A1* | 2/2009 | Kozat et al. .................. | 709/203 |
| 2011/0141969 | A1* | 6/2011 | Sridhara et al. ............. | 370/328 |

OTHER PUBLICATIONS

Ganesh, A.J. et al., "SCAMP: Peer-to-Peer Lightweight Membership Service for Large-Scale Group Communication," Lecture Notes in Computer Science, 2001, pp. 44-55, No. 2233 (Supplied by Applicant via IDS dated Apr. 4, 2012).*
Zhang, X. et al., "CoolStreaming/DONet: A Data-Driven Overlay Network for Efficient Live Media Streaming," Proceedings IEEE INFOCOM, 2005, pp. 2102-2111, vol. 3 (Supplied by Applicant via IDS dated Apr. 4, 2012).*
Ganesh, A.J. et al., "SCAMP: Peer-to-Peer Lightweight Membership Service for Large-Scale Group Communication," Lecture Notes in Computer Science, 2001, pp. 44-55, No. 2233.
Zhang, X. et al., "CoolStreaming/DONet: A Data-Driven Overlay Network for Efficient Live Media Streaming," Proceedings IEEE INFOCOM, 2005, pp. 2102-2111, vol. 3.
PCT International Search Report and Written Opinion, PCT Application No. PCT/US11/27313, Apr. 27, 2011, 13 pages.

* cited by examiner

*Primary Examiner* — Richard G Keehn
(74) *Attorney, Agent, or Firm* — Fenwick & West LLP (57) ABSTRACT

A network membership management protocol manages membership in a peer-to-peer networking environment. To join the peer-to-peer network, a new client is introduces itself to a deputy node assigned by the server to act as a point of contact for the new client. The deputy node forwards subscription requests to other neighboring nodes which probabilistically determine whether to accept the subscription request from the new client or forward the message to other neighboring nodes. In this way, a new client gains connections to a random subset of nodes on the network. The membership management protocol further includes a protocol for reassigning neighboring relationships between nodes when an active node leaves the network. Furthermore, the membership management protocol allows nodes to periodically resubscribe to the network in order to rebalance the network graph.

17 Claims, 7 Drawing Sheets

NETWORK MEMBERSHIP MANAGEMENT FOR PEER-TO-PEER NETWORKING

RELATED APPLICATIONS

This application claims priority from U.S. provisional application No. 61/311,141 entitled "High Performance Peer-To-Peer Assisted Live Content Delivery System and Method" filed on Mar. 5, 2010, the content of which is incorporated by reference herein in its entirety.

BACKGROUND

1. Field of the Invention

The invention relates generally to the field of peer-to-peer networking and more particularly to network membership management in a peer-to-peer network.

2. Description of the Related Arts

A peer-to-peer network is a networking architecture for sharing information by creating direct connections between "nodes" without requiring all information to pass through a centralized server. A challenging problem in peer-to-peer networking is determining how to assign connections between nodes to optimize network efficiency. For example, if a particular node shares too many connections with other nodes, that node may slow the distribution of information to its connected nodes. On the other hand, if a particular node shares too few connections with other nodes, that node may not be able to receive information quickly enough. Furthermore, groups of interconnected nodes may become isolated from other nodes on the network, thus causing inefficiencies in information sharing between isolated groups. The problem becomes particularly challenging when nodes are continuously joining and leaving the network. As a result, conventional peer-to-peer networks fail to provide a network membership management protocol that sufficiently optimizes the interconnections between nodes.

SUMMARY

A system, method and computer-readable storage medium are described for managing membership in a peer-to-peer networking environment. In one embodiment, each node on the network maintains two lists of neighboring nodes: a "downlink list" corresponding to a first set of neighboring nodes and an "uplink list" corresponding to a second set of neighboring nodes.

In one embodiment, a first node on the network receives a subscription request from a peer node that specifies an identity of a client seeking to join the peer-to-peer network. The subscription request includes a counter field that tracks a number of times the subscription request was forwarded in order to reach the first node. The first node modifies the message count based on receipt of the subscription request. Responsive to the modified message count indicating that a maximum number of forwards has not been reached, the first node determines whether or not to accept the subscription request. Responsive to determining to accept the subscription request, the first node adds the client's identity to its "downlink list," and sends a message to the client indicating acceptance of the subscription request. Otherwise, responsive to determining not to accept the subscription request, the first node forwards the subscription request to each node within the first node's downlink list. In one embodiment, the decision of whether or not to accept the subscription request is made randomly based on a probability distribution. If the modified message count indicates that a maximum number of forwards has been reached, the first node drops the subscription request without adding the client to its downlink list or forwarding the subscription request.

In one embodiment, a node may periodically re-subscribe to the network. For example, in one embodiment, a node selects a new parent node from the node's downlink list responsive to a subscription timeout period elapsing, and sends a re-subscription request to the new parent node. Furthermore, a node may remove a child node from its downlink list responsive to a lease timeout period elapsing with respect to the child node.

In one embodiment, a first node receives a leave request from a leaving node that specifies a new child node selected from the leaving node's downlink list. The first node then removes the leaving node's identity from the first node's downlink list and adds the new child node's identity to the first node's downlink list.

In another embodiment, the first node receives a leave request from a leaving node that specifies a new parent node selected from the leaving node's uplink list. The first node then removes the leaving node's identity from the first node's uplink list and adds the new parent node's identity to the first node's uplink list.

In one embodiment, a node may be selected as a deputy to assist a new client in joining the peer-to-peer network. The node receives a subscription request message from the new client and sends a subscription forward message to each node in its downlink list. The subscription forward message specifies the identity of the new client. Furthermore, the node sends an additional subscription forward message to C nodes selected from the node's downlink list (where C is a configurable parameter).

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION

Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems. The invention can also be in a computer program product which can be executed on a computing system.

The present invention also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

Overview

A peer-to-peer (P2P) type distributed architecture is composed of participants, (e.g., individual computing resources), that make a portion of their resources (e.g., processing power, disk storage or network bandwidth) available to other participants. A network membership management system and method determines a communication structure between nodes (alternatively referred to as "peers") and between a server (alternatively referred to as a "root" or "root node") and the nodes in the peer-to-peer network. In one embodiment, a gossip-based membership management protocol can be used in a distributed fashion, with some level of centralized control from the server. In this architecture, each node has a neighboring relationship with and maintains information about a bounded subset of nodes. Thus, a node does not necessarily have a direct connection to every other node in the network. However, information can indirectly pass between nodes that are not directly connected via hops between neighboring nodes. When operated in one such implementation, the probabilistically expected average subset size is $(c+1)*\log_2(N)$, where c is a design parameter (e.g., a fixed value or a value configured by a network administrator, typically a small integer value) and N is the total number of nodes in the system. The protocol establishes that in such a network, for any constant k, sending a multicast message to $\log_2(N)+k$ nodes (who then proceed to recursively forward the message to $\log_2(N)+k$ other nodes that have not already seen the message) will reach every node in the network graph with theoretical probability of $e^{-e^{-k}}$. Such a protocol can use public keys to distinguish nodes, rather than passwords.

Figure 1:
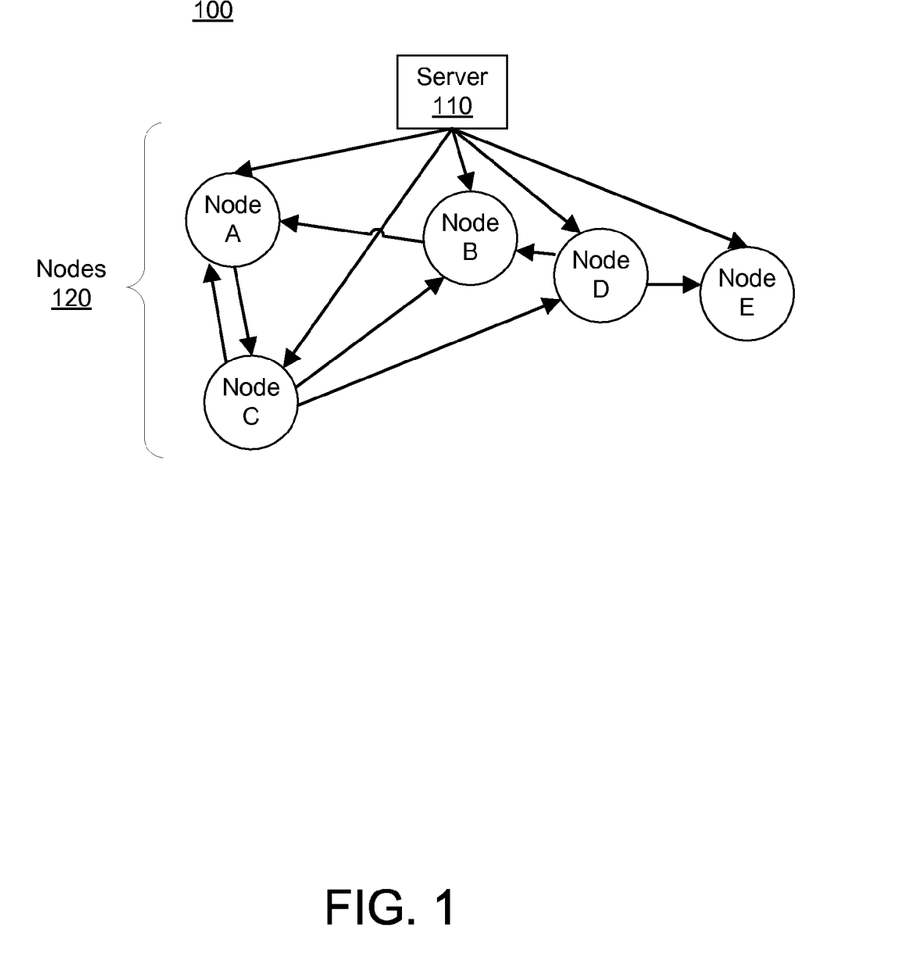
FIG. 1 illustrates an example configuration of a peer-to-peer network, in accordance with an embodiment of the present invention.

FIG. 1 illustrates an example of a peer-to-peer network 100 using the described network membership management system. The peer-to-peer network 100 comprises a server 110 and a number of nodes 120 (e.g., nodes A, B, C, D, and E). The server 110 is a computing device that provides coordinating functionality for the network. In one embodiment, the server 110 may be controlled by an administrator and has specialized functionality as will be described below. The nodes 120 are computing devices communicatively coupled to the network via connections to the server 110 and/or to one or more other nodes 120. Examples of computing devices that may act as a server or a node in the peer-to-peer network 100 are described in further detail below with reference to FIG. 6.

Each node 120 on the network may have a neighboring relationship with one or more other nodes on the network and each node maintains a list of other nodes with which it has a neighboring relationship. In one embodiment, a node X maintains two different lists of neighboring nodes: (1) a list of nodes "downlink" nodes (a downlink list or a "partial view") and (2) a list of "uplink" nodes (an uplink list or an "inView"). Whether a node Y is in a node X's uplink list or downlink list affects the types and timing of messages passed from node X to node Y, in accordance with the message passing protocol discussed below. In some cases, nodes in a node X's uplink list act as "upstream" nodes or "parent" nodes to node X, while nodes in a node X's downlink list act as "downstream" nodes or "child" nodes to node X. However, as will be described below, messages and/or data can, under different circumstances, be passed in either direction to and from uplink and downlink nodes. Thus, in some respects, the terms uplink and downlink, as used herein, are merely convenient labels for different sets of neighboring nodes in relation to a given node X, and dictate how the given node X interacts with those nodes. If a node Y is in a node X's downlink list, then the node X is in node Y's uplink list (and vice versa). If a node Y is in a node X's downlink list, node X may also be referred to herein as a "parent" node of node Y and node Y may be referred to as a "child" node of node X. A node Y may be both an uplink and a downlink node of node X, in which case node X would also be both an uplink and downlink node and node Y.

The server 110 maintains a list of all active nodes 120 on the network 100 (this may be referred to herein as the server's "downlink list" or "active list"). Generally, the server 110 can send messages directly to any node 120 and every node 120 includes the server 110 in its uplink list. In the example configuration of FIG. 1, an arrow originating at a node X points to nodes within node X's downlink list. Conversely an arrow pointing to a node X originates at a node within node X's uplink list. Furthermore, arrows originating at the server 110 point to each node 120 within the server's active list. The following table indicates the neighboring relationships in the example configuration of FIG. 1:

| Name | "Uplink List" | "Downlink List" |
|---|---|---|
| Node A | Server, B, C | C |
| Node B | Server, C, D | A |
| Node C | Server, A | A, B, D |
| Node D | Server, C | B, E |
| Node E | Server, D | None |

Message Passing Protocol for Joining Node

Figure 2:
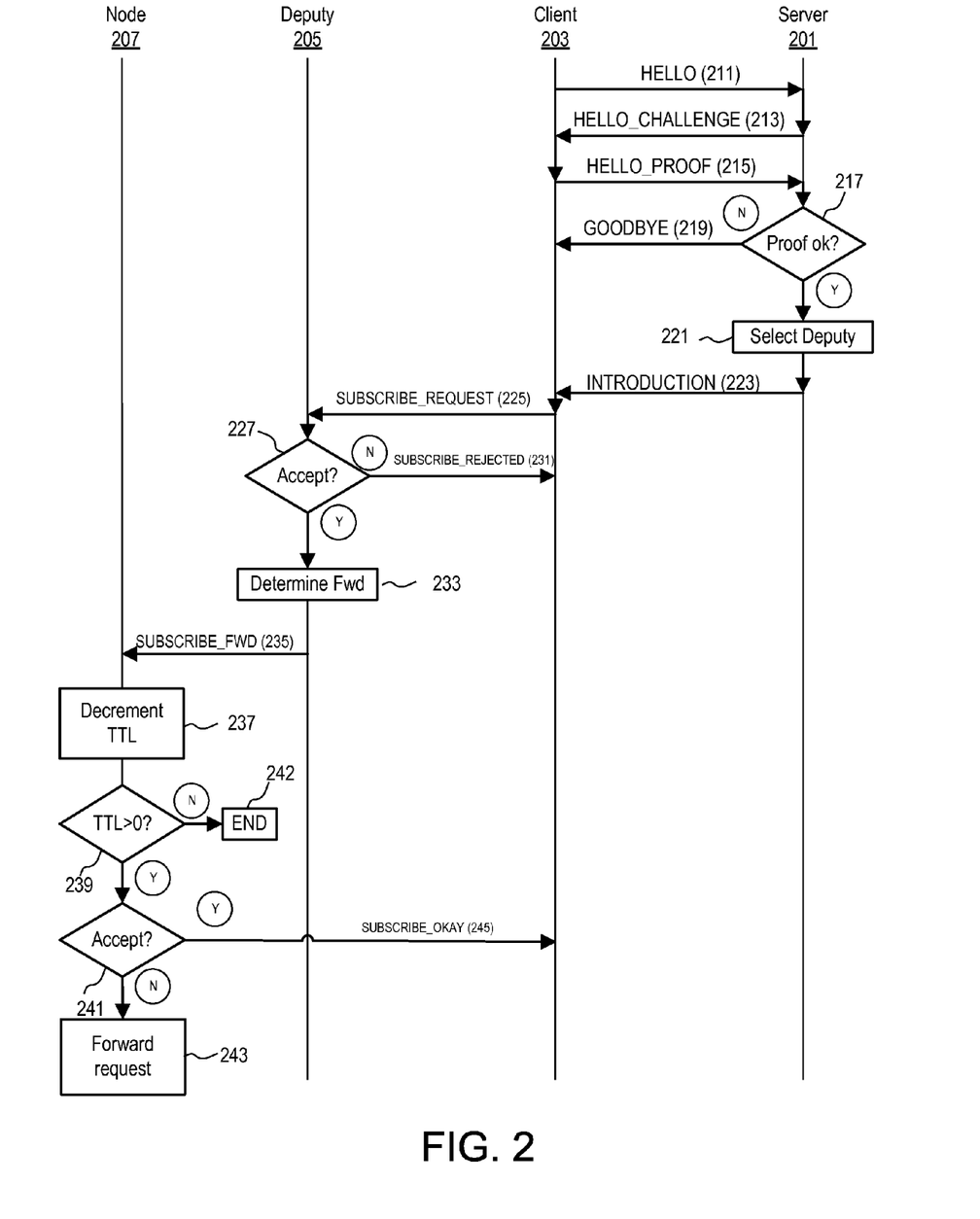
FIG. 2 is a flowchart illustrating an example process for assigning interconnections to a new client attempting to join the peer-to-peer network, in accordance with an embodiment of the present invention.

FIG. 2 illustrates an example protocol for message passing between various components of the peer-to-peer network when a new device attempts to join the network. As used herein and as illustrated in FIG. 2, the "server" 201 is a computing device that provides coordinating functionality for the network. A "client" 203 is a computing resource that in the process of joining the network and becoming a new node on the network. A "node" (or "peer" or "peer node") 207 is node that is currently active on the network. A "deputy node" (or "deputy") 205 is a node on the network that is temporarily assigned by the server 201 to act as an initial point of contact for the client 203 attempting to join the network. Any node on the network may be capable of performing the deputy role and may be temporarily assigned by the server 201 to perform the deputy role. Once the new client successfully joins the network, the deputy 205 relinquishes its role as deputy with respect to the joining client and continues to operate as a regular node 205. In one embodiment, messages sent between devices on the network within a properly-behaved TCP or UDP session. The description may refer to TCP or UDP only in certain cases, although either TCP or UDP could be used. Application-level framing is used.

Generally, the protocol randomly distributes messages to X nodes, where X could be O(log(n)), providing a high probabilistic guarantee that messages are seen by all nodes in the network without any centralized control. When a new client 203 connects to the server 201, the server 201 redirects the new client 201 to a deputy node 205 that the server 201 chooses from all the nodes in the network. Because the server 201 maintains a list of all active nodes, indirection provisions are not needed.

To begin the process of joining the network, a client 203 obtains identity information (e.g., the IP address and TCP port) of the server 201 through an external mechanism. The external mechanism could include, for example, a web request, command line parameter, or any other generic external mechanism. The client 203 sends a HELLO message 211 to the server 201 requesting access to the network. The HELLO message 211 may include identity information about the client 203 (e.g, an IP address and TCP port of the client 203, and a unique identifier for the client 203). Optionally, the HELLO message 211 may also include a public key or other secret used for authentication purposes.

In one embodiment, the server 201 uses a challenge/proof technique to determine whether or not to allow the client 203 to access the network. For example, in one embodiment, the server 201 sends a HELLO_CHALLENGE message 213 to the client 203 in response to receiving the HELLO message 211. The HELLO_CHALLENGE message 213 presents a cryptographic challenge to the client 203. In response, the client 203 sends a HELLO_PROOF message 215 to the server 201, which attempts to prove the client's identity to the server 201. Although only one HELLO_CHALLENGE and HELLO_PROOF sequence is illustrated for clarity of description, the sequence may repeat for multiple iterations. This could be used to set up decryption of data as well.

At decision block 217, the server 201 may accept or reject the access request. The server may reject the request by sending a GOODBYE message 219 to the client 203. This may occur if, for example, the server 201 doesn't recognize the identity of client 203, if the authentication fails, or if for any other reason, the server 201 does not want to allow access to client 203. Optionally, a TCP RST message (not shown) can be sent in place of the GOODBYE message 219.

Assuming the server 201 accepts the client's access request at decision block 217, the server 201 selects 221 a node from the list of active nodes on the network to act as a deputy for the client 203. In one embodiment, the server 201 randomly selects the deputy 205. The random selection may be subject to certain conditions such as, for example, a health measure or performance measure of the node. Alternatively, the server 201 may use a round robin approach. In yet another embodiment, the server 201 may choose between a round robin or random selection based on certain conditions such as duration a node has existed on the network, health of node, or performance of a node. The server 201 then sends the client 203 an INTRODUCTION message 223 that introduces the client 203 to its designated deputy 205 and instructs the client 203 to contact the deputy 205. For example, the INTRODUCTION message 223 may include the IP address and TCP port or other identifying information of the deputy 205. In one embodiment, more than one deputy may be assigned by the server 201 and introduced to the client 203 via an INTRODUCTION message 223.

In one embodiment, if the client 203 fails to receive an INTRODUCTION message 223 within a timeout period, it repeats the above joining process by sending a new HELLO message 211 to the server 201. This process can be repeated for a maximum N number of times before the client 203 gives up, where N is a parameter configurable by the network administrator or a fixed value, typically a small integer in the range of 1-15. In one embodiment, the client 203 may take further action in a continued attempt to join the network. For example, a list of servers can be provided to the client 203 and the client 203 could try alternative servers from the list.

In response to receiving the INTRODUCTION message 223, the client 203 sends a subscription request (e.g., a SUBSCRIBE_REQUEST message 225) to the deputy 205 requesting subscription to the network. The SUBSCRIBE_REQUEST message 225 may include the IP address and TCP port of the client 203, or other identifying information. In most cases, the deputy 205 accepts the request at decision block 227. Optionally, the deputy 205 responds to the SUBSCRIBE_REQUEST 225 message by sending a SUBSCRIBE_OKAY message (not shown) to the client 203 indicating acknowledgement of receipt and processing of the client's subscription request. However, the deputy 205 may also accept the request without replying to the client. Although, the deputy 205 generally accepts the request, in special instances, the deputy may reject the request at decision block 227. In one embodiment, a deputy 205 refusing a subscription request responds to the client with a SUBSCRIBE_REJECTED 231 message indicating refusal of the subscription request. While the deputy 205 generally accepts the request, it might reject the request if the deputy 205 is already overloaded or in the process of leaving the network.

Assuming the deputy 205 does not reject the subscribe request at decision block 227, the deputy 205 adds the client 203 to its uplink list and the client adds the deputy 205 to its downlink list. The deputy 205 then determines 233 where to forward the subscription request in order to allow the new client 203 to make additional connections. In one embodiment, the deputy 205 forwards the subscription request to each node in its downlink list. Additionally, the deputy 205 randomly selects C nodes from its downlink list that will receive the forwarded subscription request twice, where C is a parameter configurable by a network administrator or a fixed value, typically a small integer.

The deputy 205 forwards the subscription request by sending a forwarded subscription request (e.g., a SUBSCRIBE_FORWARD message 235) to each node within the deputy's downlink list, including, for example a peer 207 (other nodes receiving the SUBSCRIBE_FORWARD message 235 are omitted from FIG. 2 for clarity of description). The SUBSCRIBE_FORWARD message 235 includes information about the client 203 (e.g., IP address and TCP port). In one embodiment, the SUBSCRIBE_FORWARD message 235 also includes a TTL field. The TTL field is a counter field that tracks a number of times the SUBSCRIBE FORWARDS message 235 has been forwarded prior to reaching the peer 207. The use of the TTL field will be explained below. Typically the TTL field is set to be large enough for the message to easily traverse the network without overloading it. This may be an integer in the range of, for example, 10 to 50. As described above, a second SUBSCRIBE_FORWARD message 235 is sent to each of C nodes chosen randomly from the deputy's downlink list. Thus, of the nodes in the deputy's downlink list, a subset C of these nodes will receive the SUBSCRIBE_FORWARD message twice, while the remaining nodes will receive it only once.

Upon receiving a SUBSCRIBE_FORWARD message 235, the receiving peer 207 modifies the TTL field to account for its receipt of the message 235. If the TTL field indicates that a maximum number of forwards has been reached, the received SUBSCRIBE_FORWARD message 236 is dropped. Otherwise the peer 207 processes the message 235. For example, in one implementation, peer 207 decrements 237 the message count in the TTL field of the SUBSCRIBE_FORWARD message 235. If, at decision block 239, the TTL field is zero after the decrement, the received SUBSCRIBE_FORWARD message 235 is dropped and the receiving node 207 takes no further action 242. Otherwise, if, at decision block 239, the TTL field is non-zero, the node 207 decides at decision block 241 whether it should accept the client's request and add the client 203 to its downlink list, or forward the message. In alternative embodiment, the forwarded message count in the TTL field may be tracked in a different way (e.g., by incrementing a count instead of decrementing).

The decision 241 may be made based on a randomized probabilistic decision. For example, in one embodiment, a probability P that the node 207 will add the client 203 to its downlink list is computed based on the current downlink list size, where the downlink list size is the number of nodes currently in the node's downlink list. For example, an implementation can use the following formula: $P=1/(partial\_view\_size+1)$. If the node 207 does not add the client 203 to its downlink list (and the TTL field is non-zero), the node forwards 243 the SUBSCRIBE_FORWARD message to each of the nodes within its downlink list. Thus, the probability that a node will forward the message is 1-P. Furthermore, the node sends an additional SUBSCRIBE_FORWARD message to C nodes randomly chosen from its downlink list. Thus, C nodes will receive the SUBSCRIBE_FORWARD message twice. These nodes process the SUBSCRIBE_FORWARD message similarly to node 207 described above. Thus, the above process repeats as additional nodes receive the SUBSCRIBE_FORWARD message until the TTL fields all reach zero. In this way, the new client 203 is able to connect to a number of parent nodes on a probabilistic basis. In one embodiment the TTL field prevents messages from traversing the peer-to-peer network for overly long amounts of time. In another embodiment, the TTL field is used to alter the specific probability distribution used when deciding to accept or forward a subscription request message. For example, the likelihood that the message is accepted may be increased as the TTL field decreases. This improves the distribution of successful subscriptions.

If the node 207 decides to add the client 203 to its downlink list, the node 207 send a message indicating acceptance of the subscription request (e.g., a SUBSCRIBE_OKAY message 245) to the client 203. Upon receiving the SUBSCRIBE_OKAY message 245 the client 203 adds the sending node 207 to its uplink list.

Although FIG. 2 illustrates only one node 207 receiving the SUBSCRIBE_FORWARD message 235 for clarity of description, other nodes may also receive the message 235, either directly from the deputy 205, when node 207 forwards the message, or when a different node forwards the message. Each node that receives a SUBSCRIBE_FORWARD message 231 similarly performs steps 237-247 in the same manner described above and may accept or decline the client's subscription request.

In the special case when the client attempts to join a network with no nodes, the server may provide itself as the deputy to the client. Thus the server will be added into the new client's downlink list. Upon receiving the SUBSCRIBE_REQUEST message, the server will add the client to its downlink list, and reply to the client with a SUBSCRIBE_OKAY message. Upon receiving the SUBSCRIBE_OKAY message, the client adds the server to its uplink list. Thus, the server and the new node (the now joined client) are in each other's downlink list.

Figure 3A:
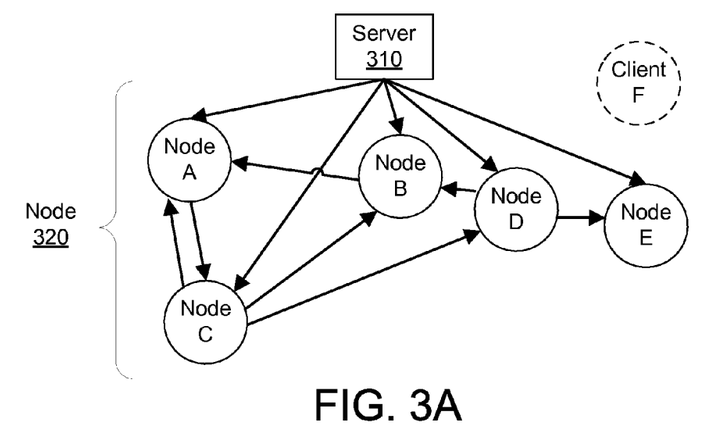
FIG. 3A is an example configuration of a peer-to-peer network prior to a client joining the network, in accordance with an embodiment of the present invention.
Figure 3B:
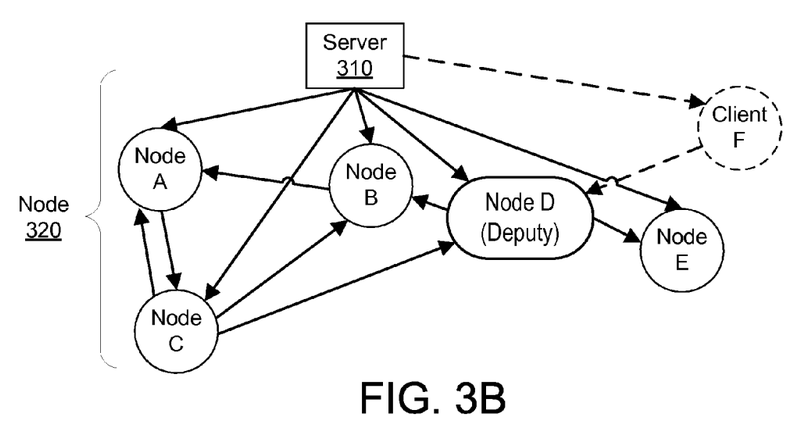
FIG. 3B is an example of an intermediate configuration of a peer-to-peer network while a new client is in the process of joining the network, in accordance with an embodiment of the present invention.

FIGS. 3A-3D illustrate an example of a changing network configuration when a new client joins the network. FIG. 3A illustrates an example starting configuration prior to the client E joining the network comprising a server 310 and a number of nodes 320. After receiving the HELLO message and accepting client E's request, the server 310 adds client E to its downlink list. Furthermore, upon receiving an INTRODUCTION message designating node D as the deputy, client F adds node D to its downlink list. This intermediate network configuration is illustrated in FIG. 3B.

Figure 3C:
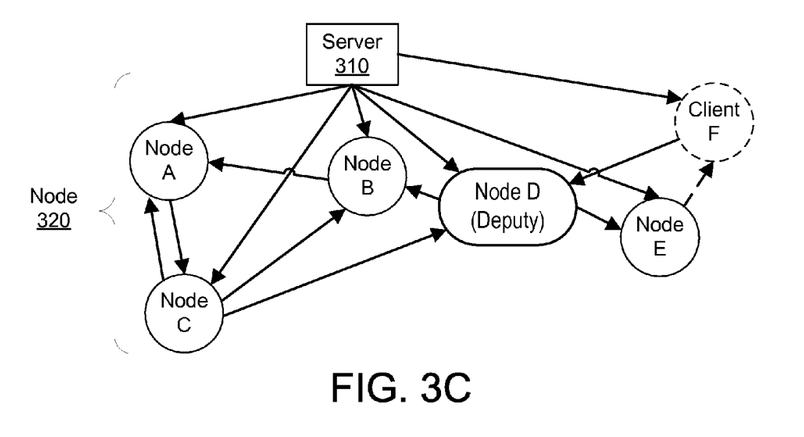
FIG. 3C is an example of an intermediate configuration of a peer-to-peer network while a new client is in the process of joining the network, in accordance with an embodiment of the present invention.
Figure 3D:
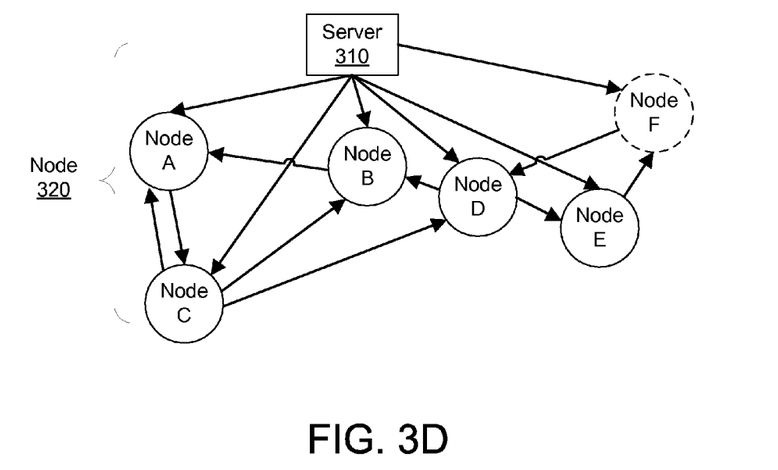
FIG. 3D is an example configuration of a peer-to-peer network following a new client joining the network, in accordance with an embodiment of the present invention.

The deputy node D then forwards the request to other nodes within its downlink list (nodes B and E). Assuming node E accepts the request, and node B denies the request, the resulting configuration is illustrated in FIG. 3C. As described above, node B may forward the subscription request and client F may therefore gain additional connections, but for the purpose of illustration, it is assumed that no additional connections are made. Deputy node D relinquishes its role as deputy with respect to client E and client E becomes a new node on the network (node E). The resulting network configuration is illustrated in FIG. 3D.

Message passing Protocol for Leaving Node

Figure 4A:
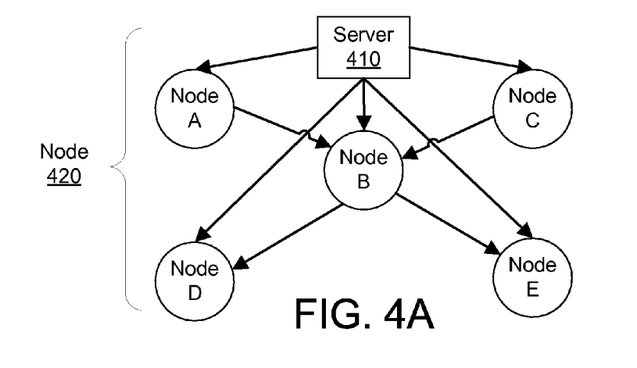
FIG. 4A is an example configuration of a peer-to-peer network prior to a node leaving the network, in accordance with an embodiment of the present invention.
Figure 4B:
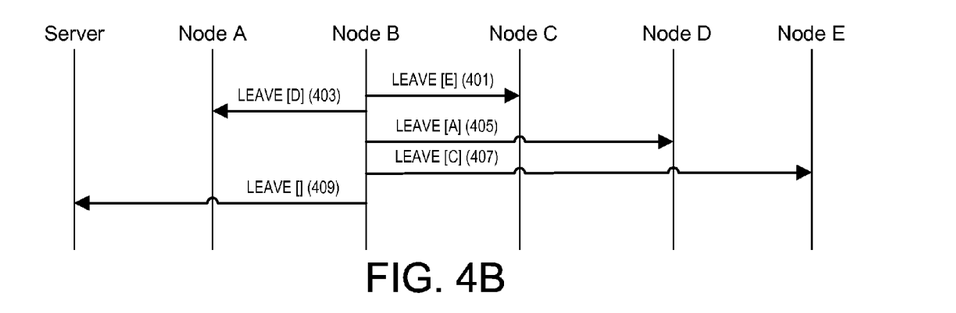
FIG. 4B is a message diagram illustrating an example of a message passing protocol when a node leaves the network, in accordance with an embodiment of the present invention.
Figure 4C:
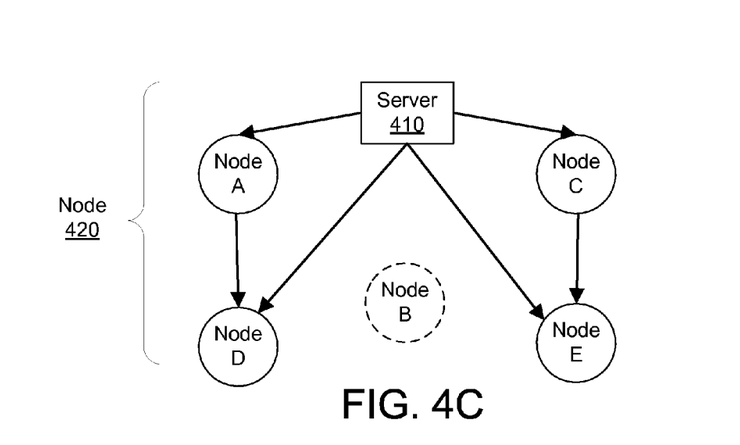
FIG. 4C is an example configuration of a peer-to-peer network after a node leaves the network, in accordance with an embodiment of the present invention.

FIGS. 4A-C illustrates how the network configuration changes when a node leaves the network. FIG. 4A illustrates an example starting configuration prior to a node B leaving a network comprising a number of nodes 420 and a server 410. Node B has two nodes in its uplink list (nodes A and C), and two nodes in its downlink list (nodes D and E).

FIG. 4B illustrates a message passing protocol between the nodes. The leaving node B sends a LEAVE message 401, 403 to each node in the leaving node B's uplink list (nodes A and C). Each such LEAVE message 401, 403 containing identifying information (e.g., IP address and TCP port) about a selected node in the leaving node's downlink list. In the illustrated example, the LEAVE message 401 to node A designates node D while the LEAVE message 403 to node C designates node E. In one embodiment, the selection of which node to designate in a LEAVE message 401, 403 is random. In another embodiment, the selection of nodes is performed in a round-robin fashion. In yet another embodiment, the selection of which node to designate is computed based on factors such as node health and network topology. Upon receiving such a LEAVE message, the node receiving the LEAVE message replaces the leaving node in its downlink list with the new node specified in the LEAVE message. Thus, node A replaces node B in its downlink list with node D (node A is the new "parent" of node D) and node C replaces node B in its downlink list with node E (node C is the new "parent" of node E).

The leaving node B also sends a LEAVE message 405, 407 to each node in its downlink list (nodes D and E). The LEAVE message 405, 407 contains identifying information (e.g., IP address and TCP port) about the new "parent" of the receiving node. Thus, the LEAVE message 405 to node D specifies node A as the new "parent," and the LEAVE message 407 to node E specifies node C as the new "parent." Upon receiving such a message, the receiving node replaces the leaving node in its uplink list with this new parent. Thus, node D replaces node B in its uplink list with node A, and node E replaces node B in its uplink list with node C.

In addition, the leaving node B sends a LEAVE message 409 to the server 410. In one embodiment, the IP address and TCP port in this message may be omitted. Upon receiving the LEAVE message 409, the server 410 removes the leaving node B from its active list. The final network configuration is illustrated in FIG. 4C.

Message Passing Protocol for Re-Subscribing Node

In one embodiment, a node re-subscribes to the network periodically. This serves to periodically rebalance the network graph. A subscription timeout period determines how frequently a node re-subscribes. For example, in one embodiment, the subscription timeout period a configurable parameter within the range 0-10 minutes. Upon establishing an initial subscription or a successful re-subscription, a node starts a subscription timer. When the subscription timeout period elapses, the node re-subscribes to a node randomly chosen from its downlink list. The re-subscribing node keeps its own downlink list intact during the re-subscription. Each node also has a lease timeout period associated with each node in its downlink list. For example, in one embodiment the lease timeout period is a configurable value in the range 0-30 minutes. Upon a lease timeout period being reached for a particular child node within a parent node's downlink list, the corresponding child node is removed from the parent node's downlink list. In one embodiment, the subscription timeout period is shorter than the lease timeout period so that a node can find enough new parent nodes before its previous lease expires.

Figure 5A:
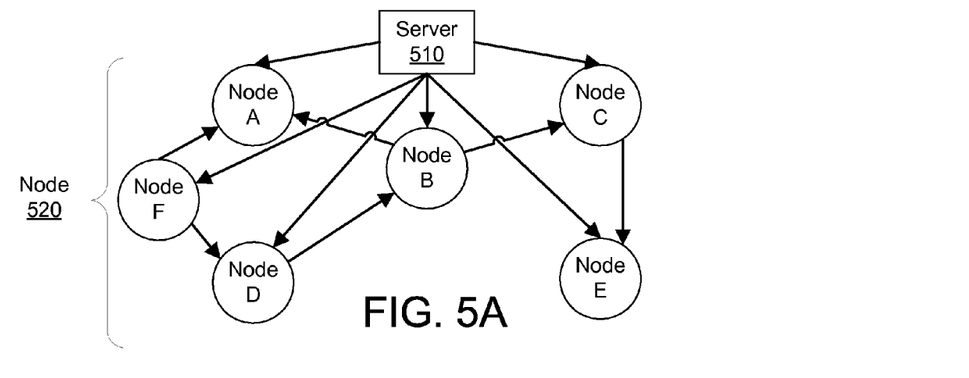
FIG. 5A is an example configuration of a peer-to-peer network prior to a node re-subscribing the network, in accordance with an embodiment of the present invention.
Figure 5B:
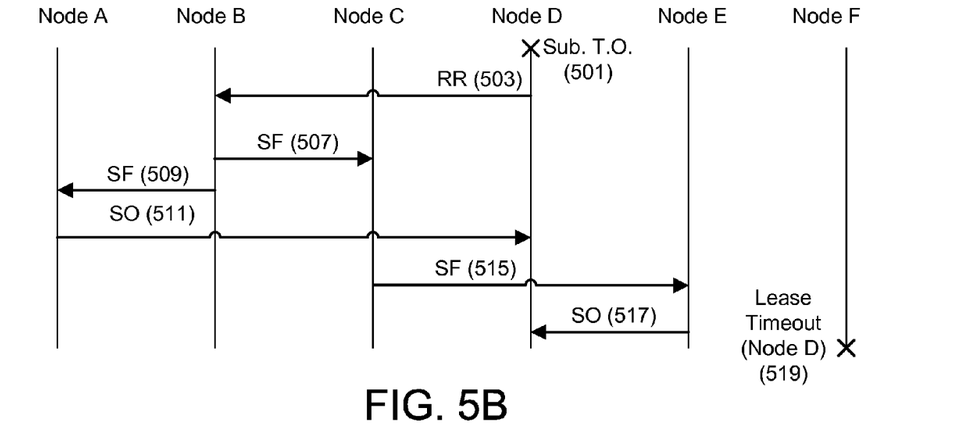
FIG. 5B is a message diagram illustrating an example of a message passing protocol when a node re-subscribes to the network, in accordance with an embodiment of the present invention.
Figure 5C:
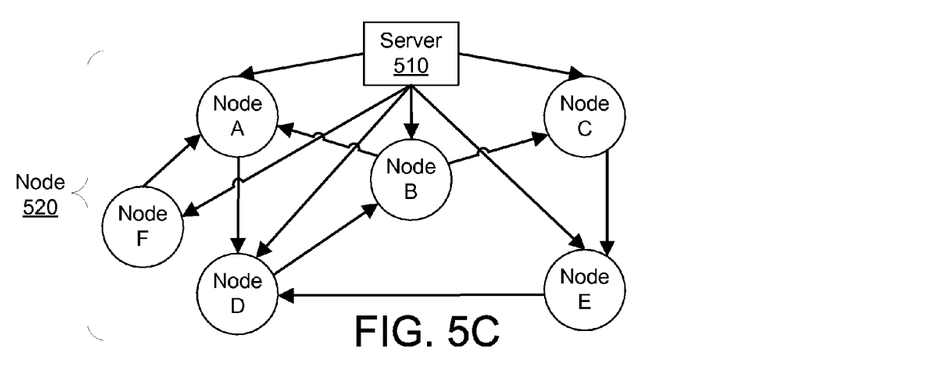
FIG. 5C is an example configuration of a peer-to-peer network after a node re-subscribes to the network, in accordance with an embodiment of the present invention.

FIGS. 5A-C illustrate an example of the re-subscription and re-leasing process. FIG. 5A illustrates an initial network configuration prior to a node D's subscription timeout period elapsing. The network configuration comprises a number of nodes 520 and a server 510. Node D has node B in its downlink list and node F in its uplink list. FIG. 5B illustrates an example of message passing that may occur during the re-subscription process. Node D's subscription timeout period elapses 501. The node D implements the re-subscription process by sending a RESUBSCRIBE_REQUEST (RR) message 503 to one of the nodes in its downlink list. This node should be chosen randomly, but may be filtered based on certain criteria such as node health or other factors. In the illustrated example, node D sends a RESUBSCRIBE_RE- QUEST (RR) message 503 to node B. The node receiving the RESUBSCRIBE_REQUEST message 503 (node B) treats it similarly to a SUBSCRIBE_REQUEST except that a different parameter C' may be used than one a SUBSCRIBE_REQUEST is received. Typically, the parameter C' is lower for a RESUBSCRIBE_REQUEST than the parameter C used for a SUBSCRIBE_REQUEST and in some embodiment C'=0 for a RESUBSCRIBE_REQUEST. Thus, the receiving node B sends SUBSCRIBE_FORWARD messages (SF) 507, 509 to each node in its downlink list (nodes A and C). As described above, a second SUBSCRIBE_FORWARD message (not shown) is sent to each of C' nodes using the lower parameter C discussed above. Upon receiving the SUBSCRIBE_FORWARD (SF) message 507, 509, nodes may probabilistically accept or reject the request. For example, in one embodiment, a node may accept the request with a probability P as described above. In the example illustration, node A probabilistically determines to accept the request 509. Thus, node A sends a SUBSCRIBE_OKAY (SO) message 511 to node D. Node A adds node D to its downlink list, and node D adds node A to its uplink list. Node C probabilistically determines to forward the request. Thus, Node C forwards a SUBSCRIBE_FORWARD (SF) message 515 to node E. Here, node E probabilistically decides to accept the request and sends a SUBSCRIBE_OKAY (SO) message 517 to node D. Thus, Node E adds node D to its downlink list, and node D adds node E to its uplink list.

At a later time, node D's lease with node F expires when the lease timeout period is reached 519. Thus, node F removes node D from its downlink list and node D removes node F from its uplink list. The resulting network configuration is illustrated in FIG. 5C.

Additional Embodiments

In one embodiment, nodes send a periodic HEARTBEAT message to other nodes indicating that the sending node is still active. For example, in one embodiment, a node is configured to send a HEARTBEAT message once per heartbeat period to each node in its downlink list. The heartbeat period is a value configurable by a network administrator or a fixed value (e.g., in the range 0-10 minutes). If a node does not receive a HEARTBEAT message from a parent node in its uplink list before the HEARTBEAT period expires, the node re-subscribes to the group of nodes to remedy the potential network partition.

In addition, an active node sends a HEARTBEAT message every T seconds to the server, notifying the server that the node is active. T is a constant parameter configurable by a network administrator. In one embodiment, for example, T may be in the range of 100 times the node-to-node heartbeat period. If the server has not heard from this node for a period of time longer than or equal to T, the server removes this client from its active list. Furthermore, the server may send a periodic ROOT_HEARTBEAT message to nodes. The ROOT_HEARTBEAT message may be forwarded by receiving nodes to other nodes. An advantage of allowing the ROOT_HEARTBEAT message to propagate through the network is to enable detection of isolated subgraphs. If the root heartbeat message is not received in a timely fashion, the node resubscribes to the group of nodes to remedy the potential network partition.

The startup of the server is controlled by operation outside of the scope of the membership management protocol. Further details regarding operation of the server is described in U.S. patent application Ser. No. 13/040,354 to Yang, et al. filed on Mar. 4, 2011 and entitled "Pod-Based Server Backend Infrastructure for Peer-Assisted Applications," which is incorporated by reference herein. Upon starting up, the server creates a TCP socket at a port as instructed by the outside mechanism, and is ready to process connection request sent to this port. The IP address and TCP port number of the server are communicated to client through a mechanism outside of the scope of the membership management protocol. The server has an initial active list that is empty.

In one embodiment, authentication and encryption of control and data messages can be used. It is possible that the network graph can be broken into geographical regions and each region can have its own server. Distributed server backbone infrastructure can be deployed to provide inter-cluster communication links for high reliability. A metric D, such as network distance, can be used to determine how far away nodes are from each other. The metric D could be, for example, delay of ping, number of hops, or bandwidth between source and destination. This information can then be used to optimize operation within the network. P The membership management system described herein is of particular use for peer-to-peer sharing of live data streams such as, for example, streaming video or audio. An example of a system and method for sharing streaming data such as streaming video is described in U.S. patent application Ser. No. 13/040, 338 to Yang, et al., filed on Mar. 4, 2011 and entitled "Peer-to-Peer Live Content Delivery," which is incorporated by reference herein. Generally, in the peer-to-peer live content delivery system, peer-to-peer sharing of data blocks (e.g., time-localized portions of video) is constrained to ensure delivery of each data block within a time constraint (e.g., within a fixed time period of being injected into the network by the server). This enables nodes to receive and continuously output data streams such as live video or audio.

The membership management method described above provides very good performance with low overhead. Specifically, nodes can generally maintain a healthy number of neighbor nodes even in the face of fairly high levels of joining and leaving nodes. At the same time, the membership management protocol does not interfere with the high-bandwidth requirements of streaming data such as video. Additionally, the combination of the gossip elements with the TTL field enables nodes to receive a diverse set of suggested nodes to peer with, even when it may be difficult (due to firewalls, etc) for some nodes to communicate with each other. Additionally, the generally distributed operation of the protocol means that little server resources are required to deal with membership management, allowing the server to handle more nodes at once.

System Architecture

Figure 6:
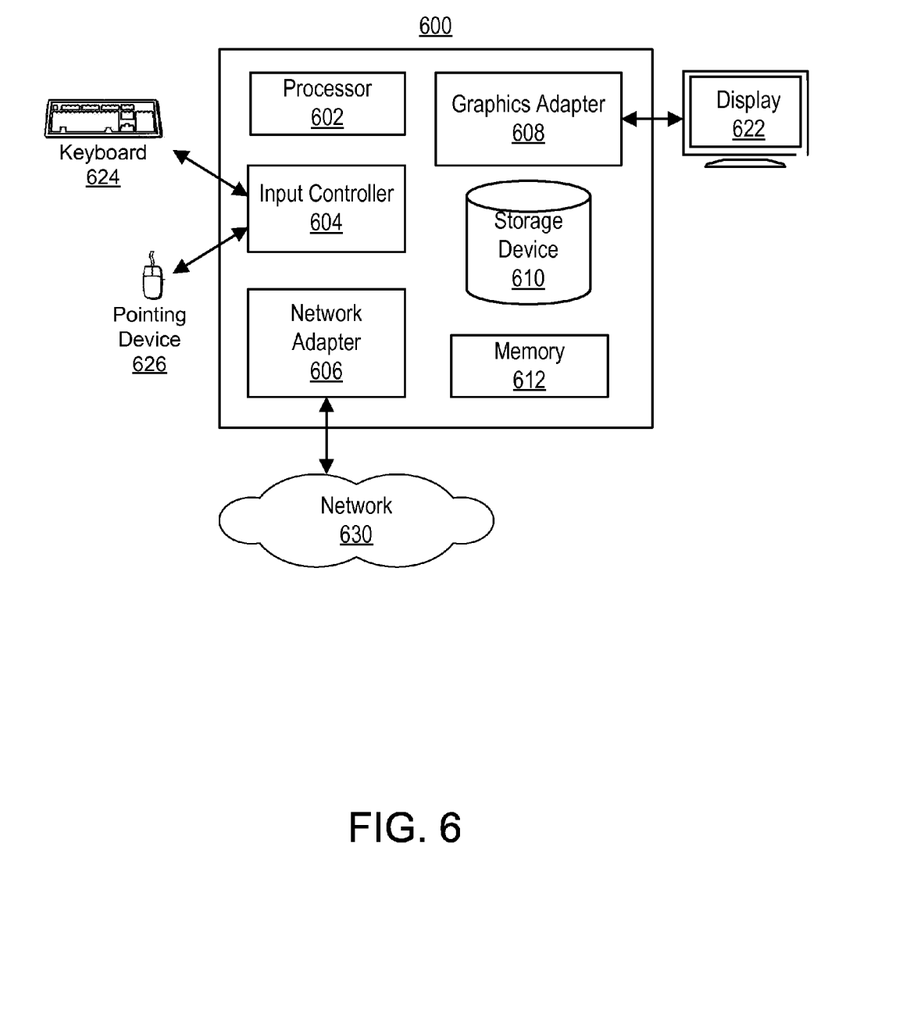
FIG. 6 is a system diagram illustrating a computing device in accordance with an embodiment of the present invention.

FIG. 6 is a high-level block diagram illustrating an example of a computing device 600 that could act as a node or a server on the peer-to-peer network. Illustrated are at least one processor 602, and input controller 604, a network adaptor 606, a graphics adaptor 608, a storage device 610, and a memory 612. Other embodiments of the computer 600 may have different architectures with additional or different components. In some embodiments, one or more of the illustrated components are omitted.

The storage device 610 is a computer-readable storage medium such as a hard drive, compact disk read-only memory (CD-ROM), DVD, or a solid-state memory device. The memory 612 store instructions and data used by the processor 602. The pointing device 626 is a mouse, track ball, or other type of pointing device, and is used in combination with the keyboard 624 to input data into the computer system 600. The graphics adapter 608 outputs images and other information for display by the display device 622. The network adapter 606 couples the computer system 600 to a network 630.

The computer 600 is adapted to execute computer program instructions for providing functionality described herein. In one embodiment, program instructions are stored on the storage device 610, loaded into the memory 612, and executed by the processor 602 to carry out the processes described herein.

The types of computers 600 operating on the peer-to-peer network can vary substantially. For example, a node comprising a personal computer (PC) may include most or all of the components illustrated in FIG. 6. Another node may comprise a mobile computing device (e.g., a cell phone) which typically has limited processing power, a small display 622, and might lack a pointing device 626. A server may comprise multiple processors 602 working together to provide the functionality described herein and may lack an input controller 604, keyboard 624, pointing device 626, graphics adapter 608 and display 622. In other embodiments, the nodes or the server could comprises other types of electronic device such as, for example, a personal digital assistant (PDA), a mobile telephone, a pager, a television "set-top box," etc.

The network 630 enables communications among the entities connected to it (e.g., the nodes and the server). In one embodiment, the network 630 is the Internet and uses standard communications technologies and/or protocols. Thus, the network 630 can include links using a variety of known technologies, protocols, and data formats. In addition, all or some of links can be encrypted using conventional encryption technologies. In another embodiment, the entities use custom and/or dedicated data communications technologies.

Upon reading this disclosure, those of skill in the art will appreciate still additional alternative designs for membership management having the features described herein. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method for managing membership in a peer-to-peer networking environment, the method performed by a first node comprising a computing device, the method comprising:
   receiving from a peer node on the peer-to-peer network a subscription request specifying an identity of a client seeking to join the peer-to-peer network, the subscription request including a counter field tracking a number of times the subscription request was forwarded in order to reach the first node;
   modifying the counter field based on receipt of the subscription request;
   responsive to the modified counter field indicating that a maximum number of forwards has not been reached, determining whether or not to accept the subscription request;
   responsive to determining to accept the subscription request, adding the client's identity to the first node's downlink list, wherein the first node's downlink list identifies a first set of neighboring nodes;
   responsive to determining not to accept the subscription request, forwarding the subscription request to each node within the first node's downlink list, the forwarded subscription request including the modified counter field;
   responsive to the modified counter field indicating that a maximum number of forwards has been reached, dropping the subscription request without adding the client's identity to the first node's downlink list or forwarding the subscription request; and
   responsive to a lease timeout period elapsing with respect to a child node within the first node's downlink list, removing the child node from the first node's downlink list.

2. The method of claim 1, wherein modifying the counter field comprises decrementing a message count in the counter field and wherein the maximum number of forwards has been reached when the message count reaches zero.

3. The method of claim 1, wherein determining whether or not to accept the subscription request comprises making a random determination according to a probability distribution.

4. The method of claim 1, wherein a probability that the first node accepts the subscription request comprises a probability $P=1/(\text{partial\_view\_size}+1)$, wherein the partial_view_size comprises a number of nodes in the first node's downlink list, and wherein a probability that the first node does not accept the subscription request comprises a probability $1-P$.

5. The method of claim 1, further comprising:
   responsive to a subscription timeout period elapsing for the first node, selecting a new parent node from the first node's downlink list; and
   sending a re-subscription request to the new parent node.

6. The method of claim 1, further comprising:
   receiving from a leaving node within the first node's downlink list, a leave request specifying a new child node selected from the leaving node's downlink list;
   removing the leaving node's identity from the first node's downlink list; and
   adding the new child node's identity to the first node's downlink list.

7. The method of claim 1, further comprising:
   receiving from a leaving node within the first node's uplink list, a leave request specifying a new parent node selected from the leaving node's uplink list, wherein the first node's uplink list identifies a second set of neighboring nodes;
   removing the leaving node's identity from the first node's uplink list; and
   adding the new parent node's identity to the first node's uplink list.

8. The method of claim 1, further comprising:
   receiving from a new client attempting to join the peer-to-peer network, a subscription request message from the new client;
   sending a subscription forward message to each node in the first node's downlink list, the subscription forward message specifying the identity of the new client; and
   sending an additional subscription forward message to C nodes, the C nodes selected from the first node's downlink list, wherein C is an integer.

9. A non-transitory computer-readable storage medium storing computer-executable instructions for managing membership in a peer-to-peer networking environment, the instructions when executed by a processor on a first node of the peer-to-peer network cause the first node to perform steps including:
   receiving from a peer node on the peer-to-peer network a subscription request specifying an identity of a client seeking to join the peer-to-peer network, the subscription request including a counter field tracking a number of times the subscription request was forwarded in order to reach the first node;

modifying the counter field based on receipt of the subscription request;

responsive to the modified counter field indicating that a maximum number of forwards has not been reached, determining whether or not to accept the subscription request;

responsive to determining to accept the subscription request, adding the client's identity to the first node's downlink list, wherein the downlink list identifies a first set of neighboring nodes;

responsive to determining not to accept the subscription request, forwarding the subscription request to each node within the first node's downlink list, the forwarded subscription request including the modified counter field;

responsive to the modified counter field indicating that a maximum number of forwards has been reached, dropping the subscription request without adding the client's identity to the first node's downlink list or forwarding the subscription request; and responsive to a lease timeout period elapsing with respect to a child node within the first node's downlink list, removing the child node from the first node's downlink list.

10. The non-transitory computer-readable storage medium of claim 9, wherein modifying the counter field comprises decrementing a message count in the counter field and wherein the maximum number of forwards has been reached when the message count reaches zero.

11. The non-transitory computer-readable storage medium of claim 9, wherein determining whether or not to accept the subscription request comprises making a random determination according to a probability distribution.

12. The non-transitory computer-readable storage medium of claim 9, wherein a probability that the first node accepts the subscription request comprises a probability $P=1/(\text{partial\_view\_size}+1)$, wherein the partial_view_size comprises a number of nodes in the first node's downlink list, and wherein a probability that the first node does not accept the subscription request comprises a probability $1-P$.

13. The non-transitory computer-readable storage medium of claim 9, further comprising:
    responsive to a subscription timeout period elapsing for the first node, selecting a new parent node from the first node's downlink list; and
    sending a re-subscription request to the new parent node.

14. The non-transitory computer-readable storage medium of claim 9, the instructions when executed further cause the first node to perform steps including:
    receiving from a leaving node within the first node's downlink list, a leave request specifying a new child node selected from the leaving node's downlink list;
    removing the leaving node's identity from the first node's downlink list; and
    adding the new child node's identity to the first node's downlink list.

15. The non-transitory computer-readable storage medium of claim 9, the instructions when executed further cause the first node to perform steps including:
    receiving from a leaving node within the first node's uplink list, a leave request specifying a new parent node selected from the leaving node's uplink list, wherein the first node's uplink list identifies a second set of neighboring nodes;
    removing the leaving node's identity from the first node's uplink list; and
    adding the new parent node's identity to the first node's uplink list.

16. The non-transitory computer-readable storage medium of claim 9, the instructions when executed further cause the first node to perform steps including:
    receiving from a new client attempting to join the peer-to-peer network, a subscription request message from the new client;
    sending a subscription forward message to each node in the first node's downlink list, the subscription forward message specifying the identity of the new client; and
    sending an additional subscription forward message to C nodes, the C nodes selected from the first node's downlink list, wherein C is an integer.

17. A method for membership management in a peer-to-peer network, the method performed by a first node comprising a computing device, the method comprising:
    receiving from a server, an INTRODUCTION message identifying a deputy, the deputy comprising an active peer node on the peer-to-peer network selected by the server;
    sending to the deputy, a SUBSCRIBE_REQUEST message requesting subscription to the network;
    receiving from at least one other node on the network, a SUBSCRIBE_OKAY message indicating acceptance of a subscription to the at least one other node;
    adding at least one child node to the first node's downlink list and at least one parent node to the first node's uplink list, wherein the first node's downlink list identifies a first set of neighboring nodes and wherein the first node's uplink list identifies a second set of neighboring nodes;
    responsive to a subscription timeout period elapsing for the first node, selecting a random node from the first node's downlink list;
    sending a re-subscription request to the randomly selected node;
    adding at least one new parent node to the first node's uplink list, wherein the at least one new parent node is selected from the randomly selected node's downlink list; and
    responsive to a lease timeout period elapsing with respect to an expiring child node within the first node's downlink list, removing the expiring child node from the first node's downlink list.

* * * * *